US006039151A

United States Patent [19]

Ringel et al.

[11] Patent Number: 6,039,151

[45] Date of Patent: Mar. 21, 2000

[54] BACKUP APPARATUS FOR A HYDRAULIC ELEVATOR BRAKE CONTROL

[75] Inventors: Cary J. Ringel, Great Neck, N.Y.; James L. Murphy, Streamwood, Ill.

[73] Assignee: Inventio AG, Hergiswil NW, Switzerland

[21] Appl. No.: 09/063,614

[22] Filed: Apr. 20, 1998

Related U.S. Application Data

[60] Provisional application No. 60/044,834, Apr. 25, 1997.

[51] Int. Cl.$^{7}$ .................... H04B 13/01

[52] U.S. Cl. .................... 187/207; 187/272; 188/67

[58] Field of Search .................... 187/207, 272, 187/275, 350, 285, 351, 360; 188/67, 189, 170

[56] References Cited

U.S. PATENT DOCUMENTS 3,902,573 9/1975 Grove .................... 187/29 R
4,449,615 5/1984 Beath et al. .................... 188/67

FOREIGN PATENT DOCUMENTS

WO 97/12829 4/1997 WIPO .

*Primary Examiner*—Kenneth W. Noland
*Attorney, Agent, or Firm*—MacMillan, Sobanski & Todd, LLC

[57] ABSTRACT

A braking device is arranged around a piston of a hydraulic elevator drive and serves for locking of the piston carrying an elevator car or a cable pulley by engaging at least two brake arms, each rotatable around axes. The brake arms are actuated by a brake drive having a brake cylinder with a plunger biased by hydraulic fluid to release the brake arms. In response to a pressure drop in the brake cylinder, or at an unauthorized downward motion of the elevator drive piston, the brake arms are closed by the brake drive and the elevator drive piston is prevented from moving. A brake control circuit connected to a power supply actuates the brake drive and includes a buffer battery backup in case of failure of the power supply and a storage capacitor backup in case of failure of the battery.

6 Claims, 3 Drawing Sheets

BACKUP APPARATUS FOR A HYDRAULIC ELEVATOR BRAKE CONTROL

This application claims priority from Provisional Application number 60/044,834, filed Apr. 25, 1997.

BACKGROUND OF THE INVENTION

The present invention relates generally to a braking device for a hydraulic elevator and in particular to a backup apparatus for operating an elevator brake upon failure of the primary and secondary power supplies.

The U.S. Pat. No. 1,903,573 shows an emergency control by means of which an elevator car of a hydraulic elevator is guided, in case of an emergency, automatically to the next-following floor, whereupon the car doors for the evacuation of the elevator car are opened. In case of a power failure, a battery fed inverter generates the necessary supply voltage for an emergency control circuit.

It is a disadvantage of this known emergency control device, that the device will only function in case the hydraulic circuit functions correctly and sufficient pressure is present in the hydraulic system.

SUMMARY OF THE INVENTION

The present invention concerns a braking device for a hydraulic elevator drive piston carrying an elevator car or a cable pulley including a pair of brake arms for engaging and preventing movement of the drive piston, the drive piston being guided in a hydraulic elevator drive cylinder and acted upon by pressured fluid in the drive cylinder, the brake arms being adapted to be rotatably mounted on the drive cylinder, and a brake drive adapted to be mounted on the drive cylinder and having a brake cylinder, the brake cylinder having a brake piston slidably retained therein and adapted to be connected to the pressured fluid in the drive cylinder, the brake piston being coupled to the brake arms whereby when the pressured fluid is supplied to the brake cylinder, the brake piston is moved in a first direction to rotate the brake arms out of engagement with the drive piston. The braking device further includes a brake control circuit for selectively actuating the brake drive to move the brake cylinder and piston in a second direction to rotate the brake arms into engagement with and to prevent movement of the drive piston.

The brake control circuit has a transformer/rectifier connected between a source of supply voltage and a voltage regulator/battery charger, has a first capacitor and a second capacitor connected to an output of the transformer/rectifier, has a coil of an electromagnet or a valve, a buffer battery and a voltage regulator connected to an output of the voltage regulator/battery charger, and has the control connected to an output of the voltage regulator and the coil for selectively electrically energizing the coil. The braking device further includes a spring means acting on the brake piston to rotate the brake arms into engagement with the drive piston whereby the supply of the pressured fluid to the brake cylinder overcomes the spring means to maintain the brake arms out of engagement with the drive piston, whereby electrical energization of the coil causes the brake arms to rotate into engagement with the drive piston.

The present invention solves the problems and avoids the disadvantages of the known device and creates a safety device by means of which a hydraulically driven elevator car can be stopped safely under all conditions.

The advantages achieved by the present invention are that the hydraulic elevator operates more dependably or reliably. Furthermore, advantageous is the fact that the buffer battery can be exchanged without interruption of the elevator operation. It is also advantageous to ensure safe elevator operation in the case of battery failure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
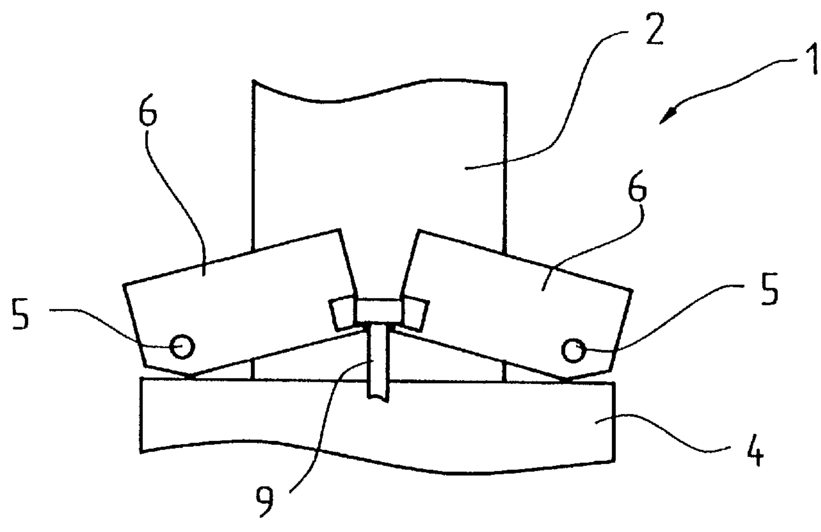
FIG. 1 is a schematic elevation view of a mechanical brake apparatus for a hydraulic elevator.
Figure 2:
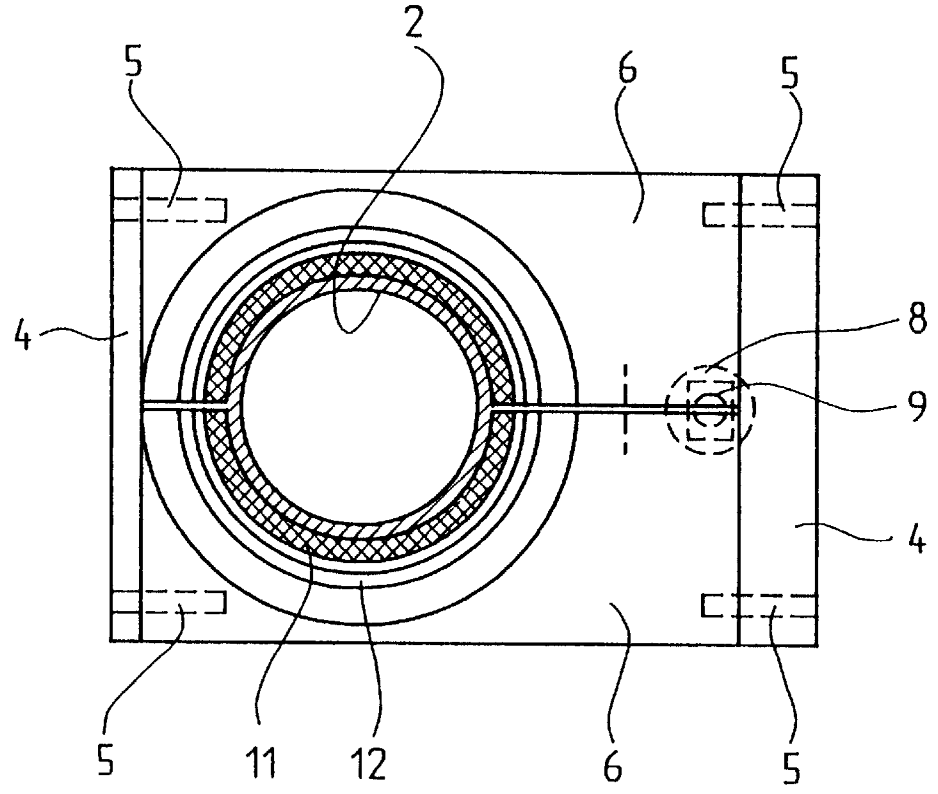
FIG. 2 is a plan view of the brake apparatus shown in the FIG. 1.
Figure 3:
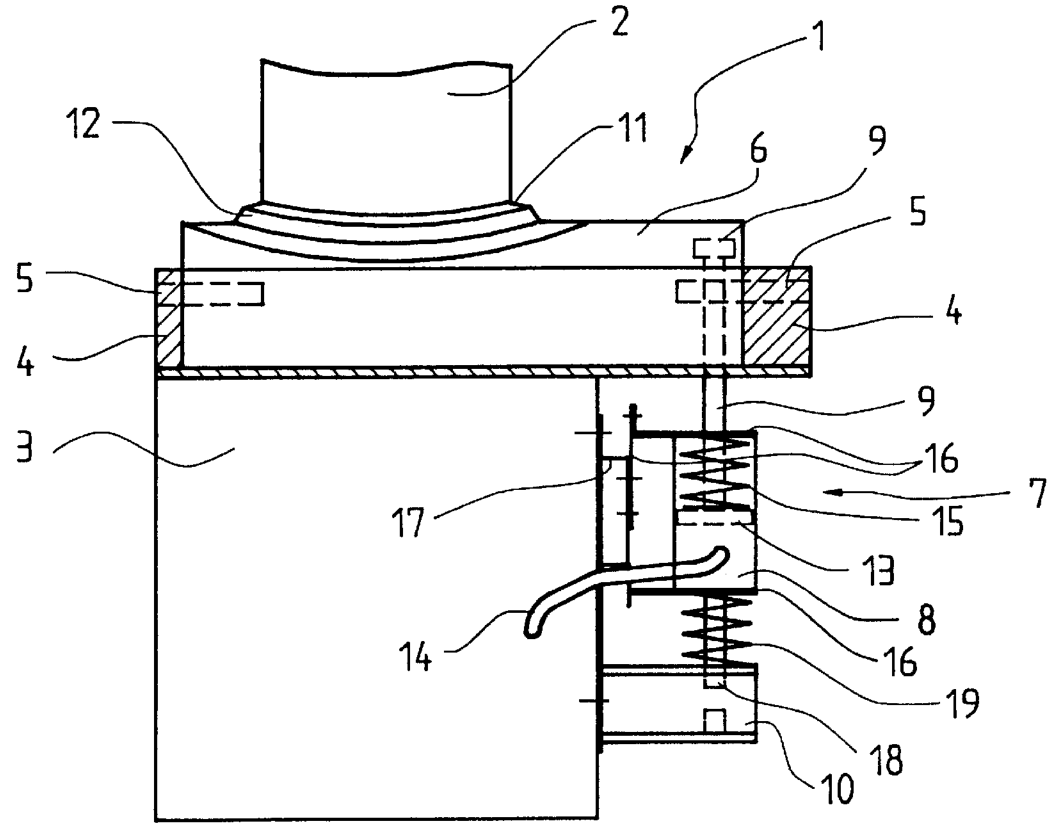
FIG. 3 is an elevation view of the brake apparatus shown in the FIG. 2.

Shown in the FIGS. 1 to 3 is a braking device 1 arranged around a piston or plunger 2 of a hydraulic elevator drive, which braking device serves for locking the piston in a stationary position. The piston 2 carries an elevator car (not shown) or a cable pulley (not shown) for vertical travel. At the upper end of a stationary hydraulic elevator drive cylinder 3 guiding the piston 2, a beam 4 is attached on which beam are arranged at least two generally U-shaped brake arms 6 each rotatable around generally horizontally extending axes or axles 5. The brake arms 6 are actuated by means of a brake drive 7, which drive consists essentially of a slidable brake cylinder 8 with a plunger 9 connected to the brake arms and an electromagnet 10 displacing the brake cylinder. As best seen from FIG. 2, the brake arms 6 are each rotatable in a generally vertical plane around the axes 5. For each brake arm 6 for example, a semicircular brake lining 11 is attached by a mounting support 12 to the brake arm facing the piston 2. When braking is initiated, the plunger 9, which is attached to the facing ends of the brake arms 6, rotates the facing ends of the brake arms in a downward direction, in which case the brake linings 11 surround and engage the piston 2 and hold the same tight against vertical movement.

The FIG. 3 shows the details of the brake drive 7. Arranged in the brake cylinder 8 is a brake piston 13, which is in connection with the plunger 9. Pressured fluid, such as oil from the hydraulic cylinder, is guided into the brake cylinder 8 by means of an oil supply line 14 connected thereto. The oil moves the brake piston 13 against the force of a first compression spring 15 in a first upwardly direction which forces the brake arms 6 open by means of the plunger 9 out of engagement with the piston 2. At pressure loss in the hydraulic cylinder 3, the first spring 15 forces the brake piston 13 downwardly, where the brake arms 6 are rotated closed and the piston 2 is being held tightly by means of the brake linings 11. The brake cylinder 8 is arranged on a sliding carriage 16, which carriage is slidably supported on a crossbeam 17. The crossbeam 17 and the electromagnet 10 are solidly attached to the exterior of the hydraulic cylinder 3. An armature 18 of the electromagnet 10 is in connection with the sliding carriage 16.

When the electromagnet 10 is supplied with electrical current, the armature 18 is pulled or drawn into the magnet and the sliding carriage 16 with the brake cylinder 8 and the plunger 9 are pulled downwardly against the forces of a second compression spring 19, whereby the brake arms 6 are rotated to the closed position and the plunger 2 is held tight by means of the brake linings 11.

Figure 4:
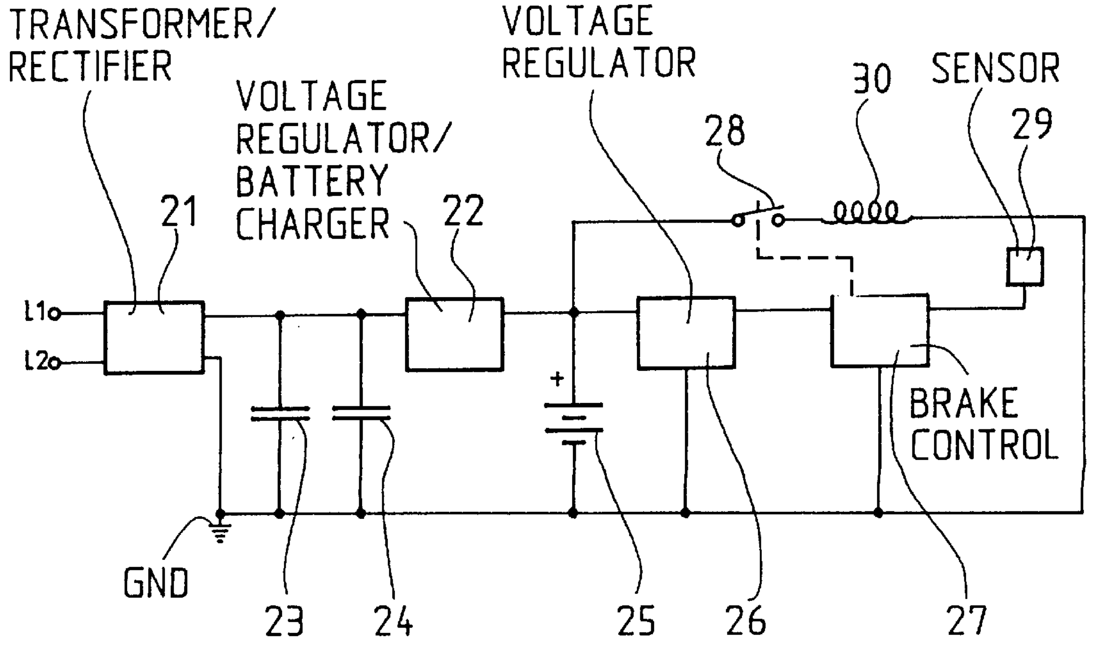
FIG. 4 is a block diagram of a control, according to the present invention, for the brake apparatus shown in the FIG. 1.

There is shown in the FIG. 4 a brake controller circuit 20 including an electrical power supply and a brake control for the electromagnet 10 of the braking device 1. The electromagnet 10 has a coil 30 that acts upon the armature 18. A supply voltage is fed to a transformer/rectifier 21 by means of leads L1, L2 connected to an input. One output of the transformer/rectifier 21 is connected to ground potential GND. A voltage carrying output is connected to the input of a voltage regulator/battery charger 22 for stabilization of the voltage. The output voltage of the transformer/rectifier 21 is smoothed by means of a first capacitor 23 connected across the two outputs. Connected in parallel with the first capacitor 23 is a second capacitor 24, which second capacitor exhibits a high storage capability for electrical energy. Under normal operating conditions, the second capacitor 24 is charged by the transformer/rectifier 21.

The voltage regulator/battery charger 22 stabilizes the input voltage to the voltage generated by a buffer battery 25 connected to an output of the regulator. Furthermore, an electronic voltage regulator 26 is connected across the buffer battery 25 to produce a supply voltage for a brake control 27 of the hydraulic elevator. By means of a switch 28, for example a relay contact or a semiconductor switch, the control 27 switches the coil 30 on or off. The switch actuation connection between the switch 28 and the control 27 is represented symbolically by a dashed line. Furthermore, for example, a speed or movement sensor 29 is connected to the control 27, which sensor detects the movement of the piston 2. At unauthorized downward motions of the piston 2, the control 27 switches on the coil 30 by means of the switch 28 to engage the brake arms 6.

When the switch 28 is closed in response to a braking requirement, current flows through the coil 30 from a source of electrical power connected to the leads L1, L2. Thus, the braking device 1 remains actuated as long as the switch 28 is closed. Upon a loss of the supply voltage, the second spring 19 will automatically move the armature 18 upwardly and return the brake arms 6 to the unactuated or released position shown in the FIG. 1. However, the battery 25 could be sized to provide enough current for a predetermined period of time to prevent the release of the braking device 1. This predetermined time period would be sufficient to enable a building backup power supply, such as an auxiliary generator, to be connected to the leads L1, L2. In theory, should both the main power supply and the battery fail, the second capacitor 24 could maintain the voltage supply for a predetermined time. However, the electromagnet 10 typically requires a substantial continuous current flow to maintain the braking device 1 in the actuated state. Therefore, the second capacitor 24 may not be able to function as a suitable backup to the battery 25.

Figure 5:
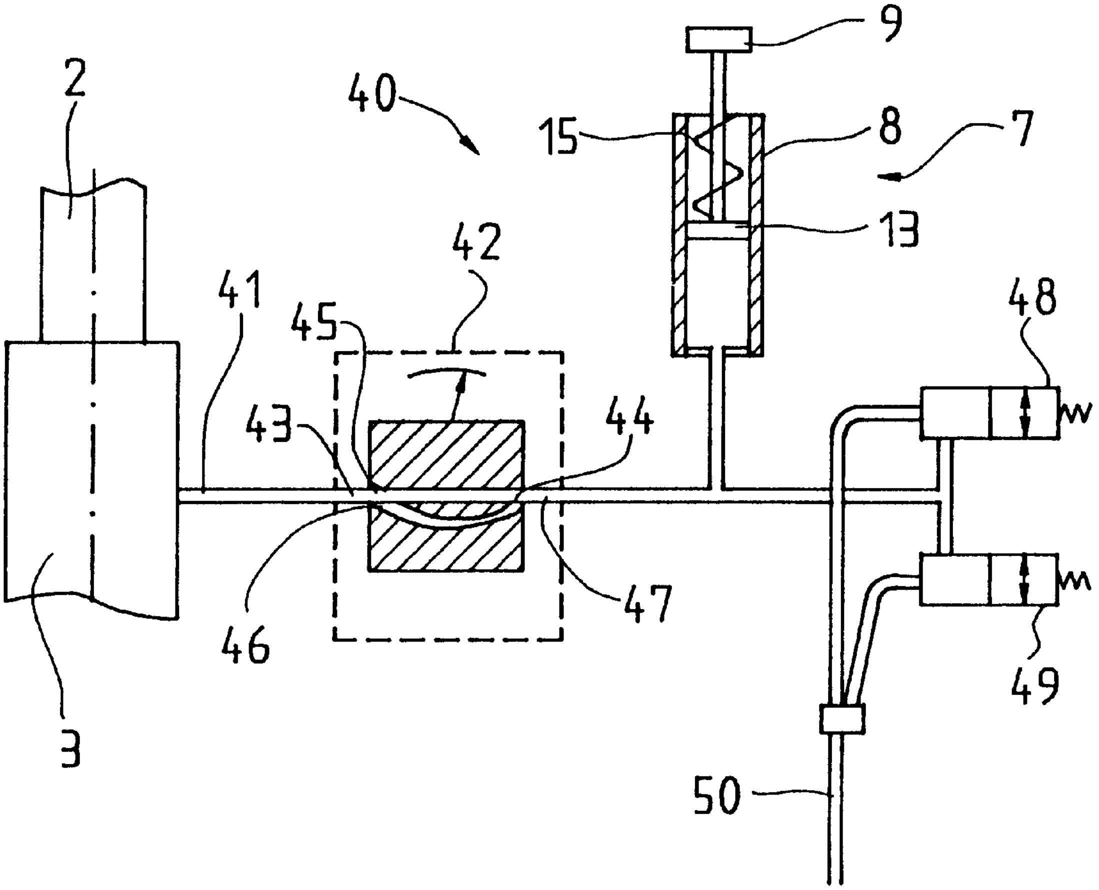
FIG. 5 is a schematic view of an alternate embodiment of the brake apparatus shown in the FIG. 3.

There is shown in the FIG. 5 an alternate embodiment braking device 40 suitable for use with the hydraulic elevator. The braking device 40 is similar to the braking device 1 in terms of the elements that engage the piston 2 which elements are not shown here. The brake drive 7 can be mounted in any suitable fixed position. However, instead of being movably actuated by the electromagnet 9, hydraulic actuation is utilized as described below.

An oil supply line 41 is connected between the drive cylinder 3, which functions as a source of pressured fluid, and an inlet of an adjustable orifice 42. The orifice 42 has an inlet port 43 to which the line 41 is connected and an outlet port 44 between which ports a first fluid path or orifice 45 extends having a manually adjustable cross-sectional area. A second fluid path 46 also extends between the ports 43 and 44 and provides a unidirectional check valve whereby fluid is permitted to flow only from the outlet port 44 to the inlet port 43 and only when the fluid pressure at the outlet port exceeds the pressure at the inlet port. A second oil supply line 47 is connected between the outlet port 44 and the brake cylinder 8. The second line 47 also is connected to inlets of a pair of electromechanical valves 48 and 49. Outlets of the valves 48 and 49 are connected to a return line 50.

The adjustable orifice 42 can be a part no. "F400 B" valve available from the Parker Hannifin Corporation, Hydraulic Valve Division, 6565 West Howard Street, Niles, Ill. The electromechanical valves 48 and 49 are available from the Parker Hannifin Corporation as a part no. "12C1S" valve, a part no. "118201-01" body and a part no. "704108-12" coil.

The electromechanical valves 48 and 49 are normally closed such that pressured fluid from the cylinder 3 flows through the orifice 42 and into the brake cylinder 8 to maintain the braking device 1 in the released state. However, the braking device 1 can be actuated by the brake controller circuit 20. The coil 30 in the circuit 20 can represent the coils in the valves 48 and 49. As described above, when the switch 28 is closed, current flows in the coil 30 to actuate the valves 48 and 49 to an open position to allow pressured fluid in the brake cylinder 8 to flow through the valves into the return line 50 thereby relieving pressure on the brake piston 13. In response, the first compression spring 15 moves the brake piston 13 downwardly thereby actuating the braking device 40.

In response to a power outage, the buffer battery 25 supplies the coil 30 of the valves 48 and 49 with current. The coil 30 can be operated in a pulsed mode with approximately two hundred millisecond current pulses under the control of the brake control 27. Thus, the buffer battery 25 has sufficient capacity to operate the brake control 27 for several days after the input power fails. In case the buffer battery 25 is defective, discharged or removed from the current circuit, the second capacitor 24 takes over the current supply for the predetermined time to supply approximately four pulses to set the brake. If the battery 25 is failed or removed and the input power is restored, a battery alarm is sounded by the brake control 27 and the elevator is allowed to operate. This feature is advantageous because it allows battery replacement while the elevator is operating.

In summary, the braking device 1 for the hydraulic elevator drive piston 2 carrying an elevator car or a cable pulley comprises: an input means for connection to a source of electrical power; a normally open switch means and a coil connected in series with said input means; a brake control connected to said switch means for closing said switch means in response to an actuation signal to provide current flow in said coil from a power supply connected to said input means thereby actuating a brake drive to move brake arms into engagement with a hydraulic elevator drive piston; a buffer battery connected to said input means for receiving charging current from the power supply connected to said input means and for providing said current flow in said coil to actuate the brake drive in the absence of the power supply; and a capacitor connected to said input means for receiving charging current from the power supply connected to said input means and for providing said current flow in said coil to actuate the brake drive in the absence of both the power supply and said buffer battery.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake controller circuit for a braking device on a hydraulic elevator drive piston carrying an elevator car or a cable pulley, the braking device including a pair of brake arms for engaging and preventing movement of the hydraulic elevator drive piston, the drive piston being guided in a hydraulic elevator drive cylinder and acted upon by pressured fluid in the drive cylinder, the brake arms being rotatably mounted on the drive cylinder and moved by a brake drive actuated by the pressured fluid, the brake controller circuit comprising:

an input means for connection to a source of electrical power;

a normally open switch means and a coil connected in series with said input means;

a brake control connected to said switch means for closing said switch means in response to an actuation signal to provide current flow in said coil from a power supply connected to said input means thereby actuating a brake drive to move brake arms into engagement with a hydraulic elevator drive piston;

a buffer battery connected to said input means for receiving charging current from the power supply connected to said input means and for providing said current flow in said coil to actuate the brake drive in the absence of the power supply; and a capacitor connected to said input means for receiving charging current from the power supply connected to said input means and for providing said current flow in said coil to actuate the brake drive in the absence of both the power supply and said buffer battery.

2. The brake controller circuit according to claim 1 including a transformer/rectifier connected between said input means and a voltage regulator, said capacitor being connected to an output of said transformer/rectifier, said buffer battery and a voltage regulator connected to an output of said voltage regulator, and said brake control being connected to an output of said voltage divider and said coil for selectively electrically energizing said coil.

3. The brake control circuit according to claim 2 including a sensor for detecting downward movement of the drive piston, said brake control being connected to said sensor for electrically energizing said coil in response to unauthorized downward movement of the drive piston sensed by said sensor.

4. The brake control circuit according to claim 2 wherein said normally open switch is connected between said output of said voltage regulator and said coil, said switch being connected to said brake control for actuation between open and closed states.

5. The brake control circuit according to claim 1 wherein said brake control actuates said switch in a pulsed manner.

6. The brake control circuit according to claim 5 wherein said brake control closes said switch for approximately 200 milliseconds during each pulse.

* * * * *